(12) United States Patent
Nakai et al.

(10) Patent No.: US 10,113,891 B2
(45) Date of Patent: Oct. 30, 2018

(54) FLOW RATE MEASUREMENT DEVICE

(71) Applicant: Panasonic Intellectual Property Management Co., Ltd., Osaka-shi, Osaka (JP)

(72) Inventors: Hiroshi Nakai, Nara (JP); Kenji Yasuda, Kyoto (JP); Masato Satou, Nara (JP); Hideaki Morihana, Nara (JP); Yuji Fujii, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/537,182

(22) PCT Filed: Mar. 11, 2016

(86) PCT No.: PCT/JP2016/001376
§ 371 (c)(1),
(2) Date: Jun. 16, 2017

(87) PCT Pub. No.: WO2016/166933
PCT Pub. Date: Oct. 20, 2016

(65) Prior Publication Data
US 2017/0343398 A1    Nov. 30, 2017

(30) Foreign Application Priority Data

Apr. 16, 2015   (JP) .................................. 2015-083825

(51) Int. Cl.
| | | |
|---|---|---|
| *G01F 1/66* | (2006.01) |
| *B32B 3/12* | (2006.01) |
| *F15B 1/02* | (2006.01) |

(52) U.S. Cl.
CPC ............... *G01F 1/662* (2013.01); *B32B 3/12* (2013.01); *F15B 1/02* (2013.01)

(58) Field of Classification Search
CPC ..................................................... G01F 1/662
See application file for complete search history.

(56) References Cited

U.S. PATENT DOCUMENTS 5,351,560 A  * 10/1994  Russwurm ............. G01F 1/662
                                                              73/861.18
6,748,811 B1    6/2004  Iwanaga et al.
(Continued)

FOREIGN PATENT DOCUMENTS

EP         2180298 A1     4/2010
JP     2003-065817 A      3/2003
(Continued)

OTHER PUBLICATIONS

International Search Report of PCT application No. PCT/JP2016/001376 dated Apr. 5, 2016, 1 page.
(Continued)

*Primary Examiner* — Jewel V Dowtin
(74) *Attorney, Agent, or Firm* — Brinks Gilson & Lione

(57) ABSTRACT

A flow rate measurement device includes a turbulence reduction component having opening portions and disposed between a measurement channel and a pair of hole portions across which a pair of ultrasonic transceivers are disposed from the measurement channel. The pair of opening portions of the turbulence reduction component each have frame pieces which are substantially identical in width. This makes it possible to reduce, with small attenuation of ultrasound, the occurrence of turbulence that is attributable to entrained flows in the pair of hole portions and is a cause of measurement error, thereby ensuring measurement accuracy.

3 Claims, 6 Drawing Sheets

(56) References Cited

U.S. PATENT DOCUMENTS

| | | | | |
|---|---|---|---|---|
| 7,823,462 B2* | 11/2010 | Brown | ............... | G01F 1/662 |
| | | | | 73/861.27 |
| 8,291,773 B2* | 10/2012 | Dietz | ............... | G01F 1/662 |
| | | | | 73/861.31 |
| 8,689,638 B2* | 4/2014 | Shen | ............... | G01F 1/662 |
| | | | | 73/861.25 |
| 9,031,797 B2* | 5/2015 | Huang | ............... | G01F 1/663 |
| | | | | 702/48 |
| 9,304,023 B2* | 4/2016 | Pearson | ............... | G01F 1/66 |
| 9,372,105 B2* | 6/2016 | Miyata | ............... | G01F 1/662 |
| 9,551,603 B2* | 1/2017 | Satou | ............... | G01F 1/66 |
| 10,012,521 B2* | 7/2018 | Priyadarshana | ............... | G01F 1/66 |
| 2012/0272750 A1 | 11/2012 | Fujii et al. | | |

FOREIGN PATENT DOCUMENTS

| | | |
|---|---|---|
| JP | 2011-112377 | 6/2011 |
| JP | 2014-215060 A | 11/2014 |
| WO | 2000/055581 | 9/2000 |

OTHER PUBLICATIONS

The Extended European Search Report dated Apr. 13, 2018 for the related European Patent Application No. 16779732.3.

\* cited by examiner

FLOW RATE MEASUREMENT DEVICE

This application is a 371 application of PCT/JP2016/001376 having an international filing date of Mar. 11, 2016, which claims priority to JP 2015-083825 filed Apr. 16, 2015, the entire contents of which are incorporated herein by reference.

TECHNICAL FIELD

The present invention relates to a flow rate measurement device which measures a flow rate using ultrasound, and relates in particular to a flow rate measurement device having hole portions between ultrasonic transceivers and a measurement channel.

BACKGROUND ART

As the flow rate measurement device of this type, a flow rate measurement device having an ultrasonic transmission film disposed between ultrasonic transceivers and a measurement channel is conventionally known (see Patent Literature 1, for example).

FIG. 6 is an exploded perspective view of a flow rate measurement device disclosed in Patent Literature 1.

As illustrated in FIG. 6, flow rate measurement device 101 includes channel body 102 and sensor block 103.

Channel body 102 includes measurement channel 104 having a rectangular cross section. Measurement channel 104 is divided into a plurality of flat channels by a plurality of partition plates 105.

First ultrasonic transceiver 106 and second ultrasonic transceiver 107 are attached to sensor block 103. An ultrasonic transmission film 108 is disposed between measurement channel 104 and first and second ultrasonic transceivers 106 and 107. Ultrasonic transmission film 108 is formed as a single piece using a mesh material, for example.

FIG. 7 is a vertical cross section of flow rate measurement device 101 illustrated in FIG. 6, taken along a plane along the flow direction.

As illustrated in FIG. 7, first hole portion 109 is formed between first ultrasonic transceiver 106 and measurement channel 104, and second hole portion 110 is formed between second ultrasonic transceiver 107 and measurement channel 104. Ultrasonic transmission film 108 is disposed between first hole portion 109 and measurement channel 104 and between second hole portion 110 and measurement channel 104, and reduces the occurrence of turbulence caused by entrained flows in first hole portion 109 and second hole portion 110.

In this configuration, ultrasound emitted from first ultrasonic transceiver 106 passes through ultrasonic transmission film 108 via first hole portion 109, and then travels into measurement channel 104 and is reflected at bottom surface 111 of measurement channel 104. After that, the ultrasound passes through ultrasonic transmission film 108 again, and reaches second ultrasonic transceiver 107 via second hole portion 110. The flow rate of a fluid passing through measurement channel 104 is measured based on a propagation time it takes for the ultrasound emitted from first ultrasonic transceiver 106 to reach second ultrasonic transceiver 107.

CITATION LIST

Patent Literature

PTL 1: Japanese Unexamined Patent Application Publication No. 2011-112377

SUMMARY OF THE INVENTION

With the above conventional configuration, however, the ultrasound attenuates when passing through ultrasonic transmission film 108, causing a decrease in the receiving sensitivity of second ultrasonic transceiver 107.

When the receiving sensitivity is too low, the receiving waveform cannot be acquired accurately, which causes a decrease in precision of the propagation time measurement, thereby hindering accurate flow rate measurement.

The present invention is to solve the above conventional problem and uses, in place of the ultrasonic transmission film, a turbulence reduction component having opening portions. It is an object to thereby reduce attenuation of ultrasound, increase the receiving sensitivity, and achieve accurate flow rate measurement.

A flow rate measurement device according to the present invention includes, in place of an ultrasonic transmission film, a turbulence reduction component having opening portions. This reduces the attenuation of ultrasound, thus making it possible to increase the receiving sensitivity and achieve accurate flow rate measurement.

DETAILED DESCRIPTION OF THE EXEMPLARY EMBODIMENT

In a first aspect, a flow rate measurement device includes: a measurement channel; a pair of hole portions each being in communication with the measurement channel; a pair of ultrasonic transceivers disposed across the pair of hole portions from the measurement channel; and a propagation time measurer which measures a propagation time between the pair of ultrasonic transceivers. The flow rate measurement device further includes: a flow rate calculator which calculates a flow rate based on a flow velocity determined from the propagation time measured by the propagation time measurer; and a turbulence reduction component disposed between the pair of hole portions and the measurement channel and having a pair of opening portions at positions corresponding to the pair of hole portions. The pair of opening portions of the turbulence reduction component each have frame pieces which are substantially identical in width. This makes it possible to reduce, with small attenuation of ultrasound, the occurrence of turbulence caused by entrained flows in the hole portions, thereby achieving accurate flow rate measurement.

In a second aspect, a plurality of openings demarcated by the frame pieces are formed in the pair of opening portions according to the first aspect in particular, and the plurality of openings each have a hexagonal shape and are arranged in a staggered pattern. This makes it possible to further reduce the occurrence of turbulence caused by the entrained flows in the hole portions, thereby achieving more accurate flow rate measurement.

In a third aspect, (i) in the measurement channel according the second aspect in particular, a plurality of partition plates oriented in parallel to a flow direction are arranged side by side in a direction orthogonal to the flow direction, (ii) the plurality of partition plates divide the measurement channel into a plurality of channel layers, and (iii) a channel width of each of the plurality of channel layers is greater than a diameter of circumcircles of the plurality of openings formed in the pair of opening portions and each having the hexagonal shape. This makes it possible to further reduce the occurrence of turbulence by dividing the entrained flows in the hole portions, thereby achieving further accurate flow rate measurement.

Hereinafter, an embodiment of the present invention will be described with reference to the drawings. It should be understood that the present invention is not limited to this embodiment.

Embodiment 1

Figure 1:
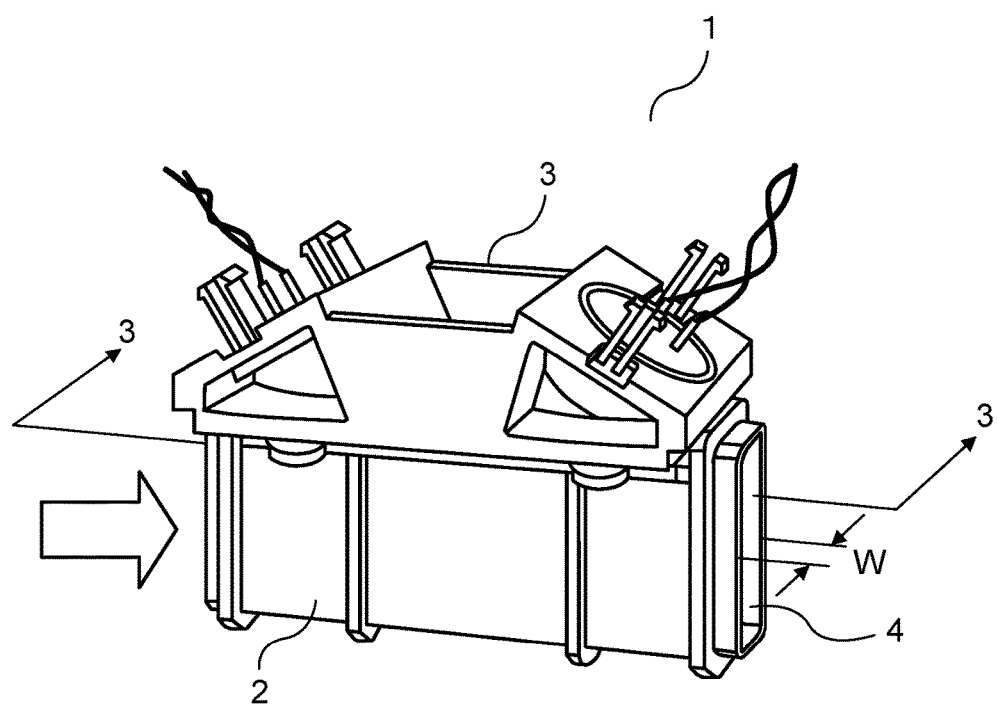
FIG. 1 is a FIG. 1 is a perspective view of a flow rate measurement device according to Embodiment 1 of the present invention.
Figure 2:
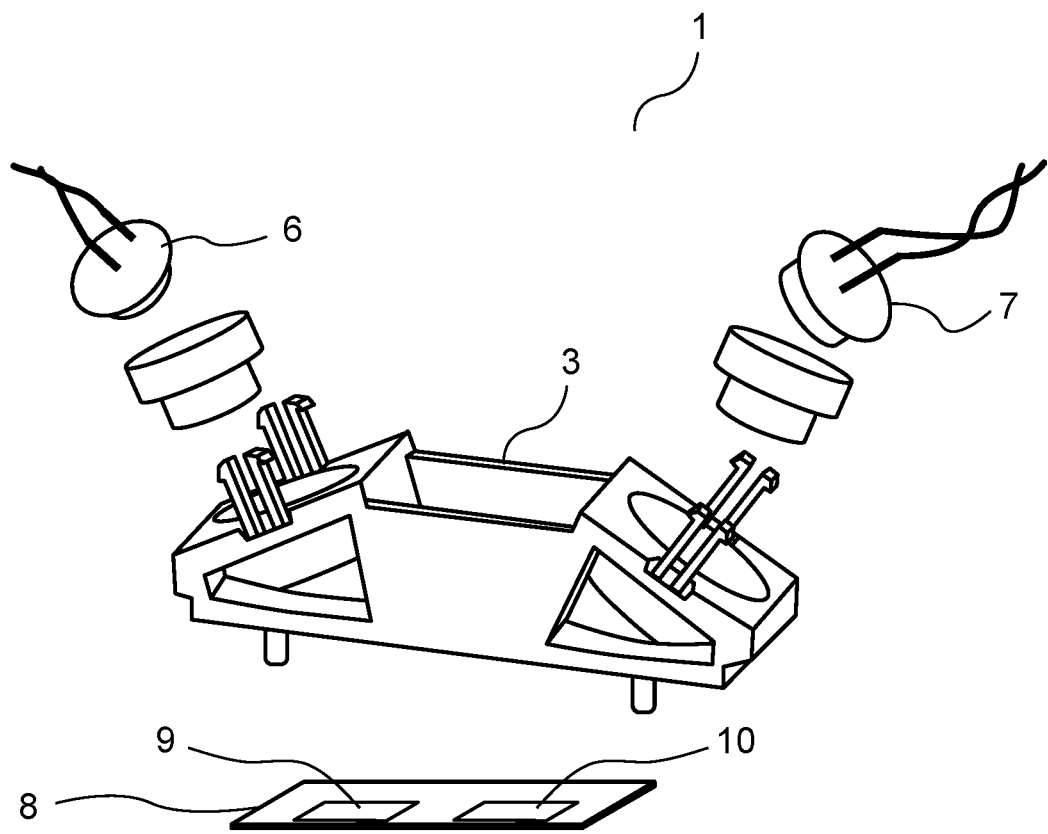
FIG. 2 is an exploded perspective view of the same flow rate measurement device.
Figure 2:
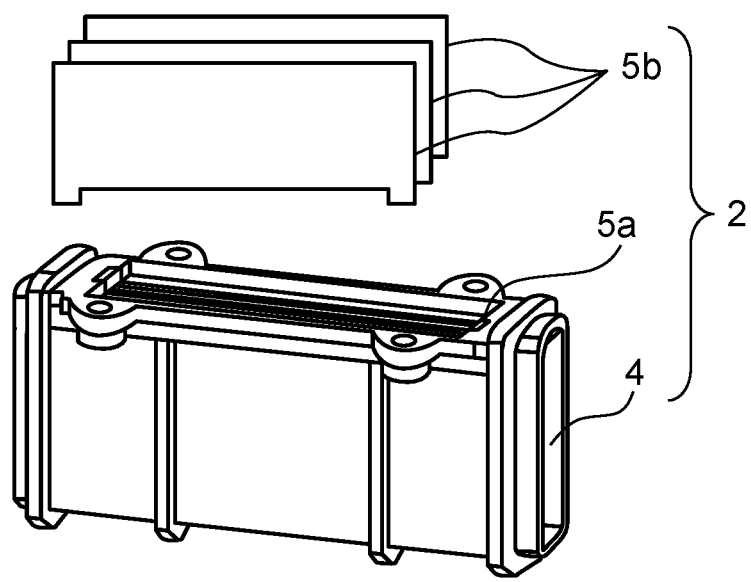
Figure 3:
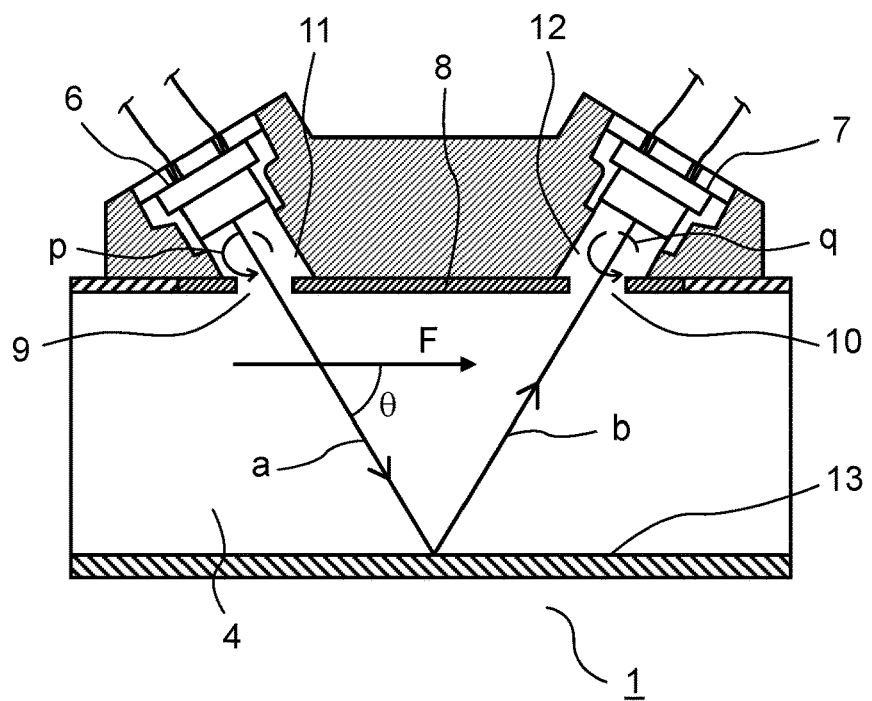
FIG. 3 is a cross section of the same flow rate measurement device along line 3-3 in FIG. 1.

Embodiment 1 will be described with reference to FIG. 1 to FIG. 5. FIG. 1 is a perspective view of a flow rate measurement device according to Embodiment 1 of the present invention. FIG. 2 is an exploded perspective view of the same flow rate measurement device. FIG. 3 is a cross section of the same flow rate measurement device along line 3-3 in FIG. 1.

In FIG. 1, flow rate measurement device 1 includes channel block 2 and ultrasonic transceiver block 3.

In FIG. 2, measurement channel 4 having a rectangular section is formed inside channel block 2. Measurement channel 4 is divided into a plurality of channel layers by a plurality of partition plates 5b. Each partition plate 5b is fixed to channel block 2 by having edges inserted into a plurality of grooves 5a provided in channel block 2.

First ultrasonic transceiver 6 and second ultrasonic transceiver 7 are attached to ultrasonic transceiver block 3. Both ultrasonic transceivers 6 and 7 have both a function of transmitting ultrasound and a function of receiving ultrasound.

Turbulence reduction component 8 is disposed between channel block 2 and ultrasonic transceiver block 3. Turbulence reduction component 8 is sheet-shaped and has first opening portion 9 and second opening portion 10.

Turbulence reduction component 8 is disposed on the plurality of partition plates 5b, and is sandwiched between the plurality of partition plates 5b and ultrasonic transceiver block 3 while being pressed from above by ultrasonic transceiver block 3.

In FIG. 3, first hole portion 11 is formed between first ultrasonic transceiver 6 and measurement Channel 4, and second hole portion 12 is formed between second ultrasonic transceiver 7 and measurement channel 4. Turbulence reduction component 8 is disposed between first hole portion 11 and measurement channel 4 and between second hole portion 12 and measurement channel 4, and reduces the occurrence of turbulence caused by entrained flows in first hole portion 11 and second hole portion 12.

Moreover, turbulence reduction component 8 is disposed such that first opening portion 9 is in communication with first hole portion 11 and second opening portion 10 is in communication with second hole portion 12. Ultrasound emitted from first ultrasonic transceiver 6 passes through first opening portion 9 of turbulence reduction component 8 via first hole portion 11, and then reaches bottom surface 13 of measurement channel 4 by path a leading into measurement channel 4. After that, the ultrasound is reflected at bottom surface 13, passes through second opening portion 10 of turbulence reduction component 8 by path b, and then reaches second ultrasonic transceiver 7 via second hole portion 12. Ultrasound emitted from second ultrasonic transceiver 7 passes through second opening portion 10 of turbulence reduction component 8 via second hole portion 12, and then reaches bottom surface 13 of measurement channel 4 by path b leading into measurement channel 4. After that, the ultrasound is reflected at bottom surface 13, passes through first opening portion 9 of turbulence reduction component 8 by path a, and then reaches first ultrasonic transceiver 6 via first hole portion 11.

Flow rate measurement device 1 further includes a propagation time measurer (not illustrated) which measures a propagation time of ultrasound, and a flow rate calculator (not illustrated) which calculates a flow rate based on a flow velocity determined from the propagation time. Flow rate measurement is performed by the propagation time measurer and the flow rate calculator.

Next, the flow rate measurement using ultrasound will be described with reference to FIG. 3.

Assume V as the flow velocity of the fluid flowing through measurement channel 4 and C as the velocity of sound in the fluid (the velocity of ultrasound in the fluid). Also assume θ as the angle between the flow direction of the fluid (the traveling direction of measured flow F (described later)) and the propagation direction of ultrasound before being reflected at bottom surface 13 (the traveling direction along path a). Further assume L as the effective length of the propagation path of ultrasound propagating between first ultrasonic transceiver 6 and second ultrasonic transceiver 7 (path a+path b).

Here, propagation time t1 it takes for ultrasound emitted from first ultrasonic transceiver 6 to reach second ultrasonic transceiver 7 is represented by Expression (1) below.

$$t1 = L/(C+V \cos \theta) \qquad \text{Expression (1)}$$

Next, propagation time t2 it takes for ultrasound emitted from second ultrasonic transceiver 7 to reach first ultrasonic transceiver 6 is represented by Expression (2) below.

$$t2 = L/(C-V \cos \theta) \qquad \text{Expression (2)}$$

Clearing velocity of sound C in the fluid from Expression (1) and Expression (2) gives Expression (3) below.

$$V = L/(2 \cos \theta ((1/t1)-(1/t2))) \qquad \text{Expression (3)}$$

As can be understood from Expression (3), if length L and angle θ are known, flow velocity V can be determined using propagation time t1 and propagation time t2 measured by the propagation time measurer (not illustrated).

Next, as shown in Expression (4) below, overall flow rate Q of measurement channel 4 (the flow rate of the fluid flowing through measurement channel 4) is calculated by multiplying flow velocity V by cross-sectional area S of measurement channel 4.

$$Q = V \times S \quad \text{Expression (4)}$$

However, in general, measured flow velocity V is different from overall average flow velocity Vave of measurement channel 4, and thus, actual flow rate Qt is calculated by multiplying flow rate Q by correction coefficient k as shown in Expression (5) below.

$$Qt = k \times Q \quad \text{Expression (5)}$$

Figure 4:
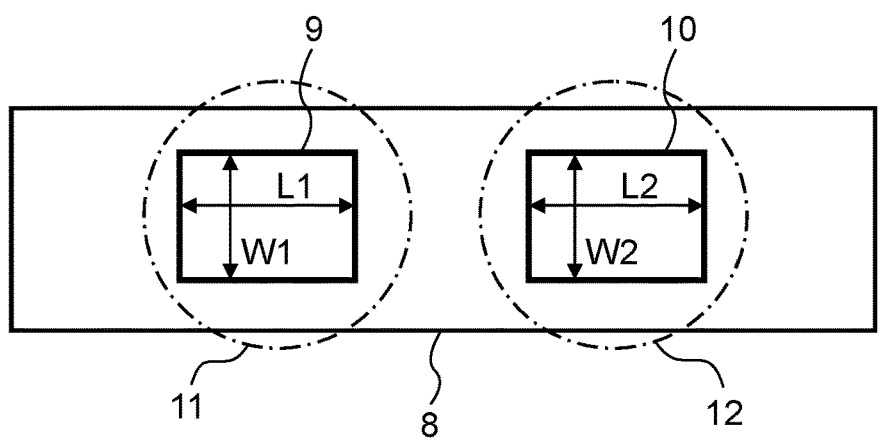
FIG. 4 is a plan view of a turbulence reduction component according to Embodiment 1 of the present invention.
Figure 5:
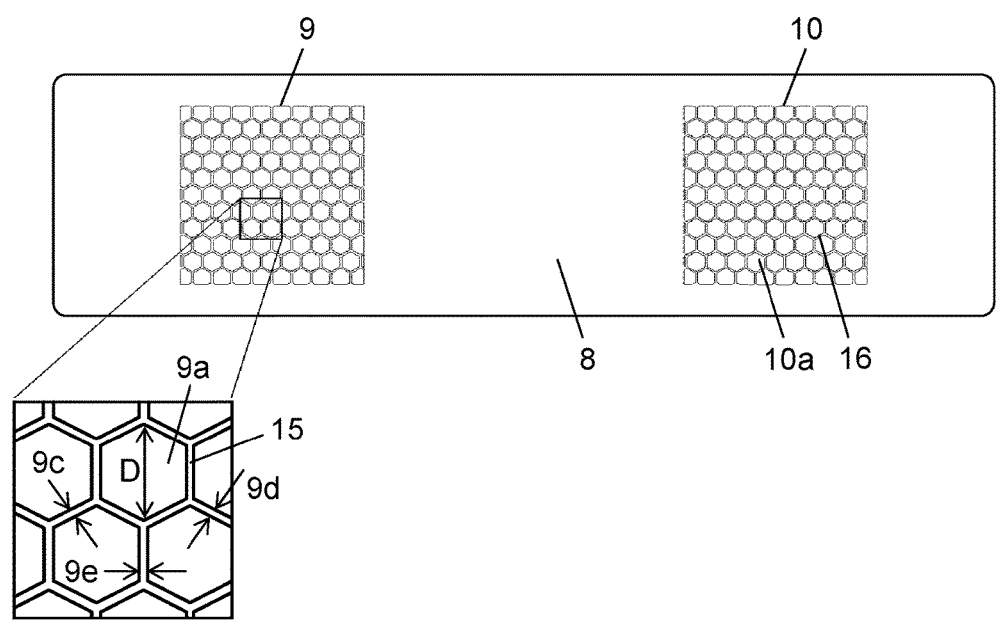
FIG. 5 is a detailed plan view of the same turbulence reduction component.
Figure 6:
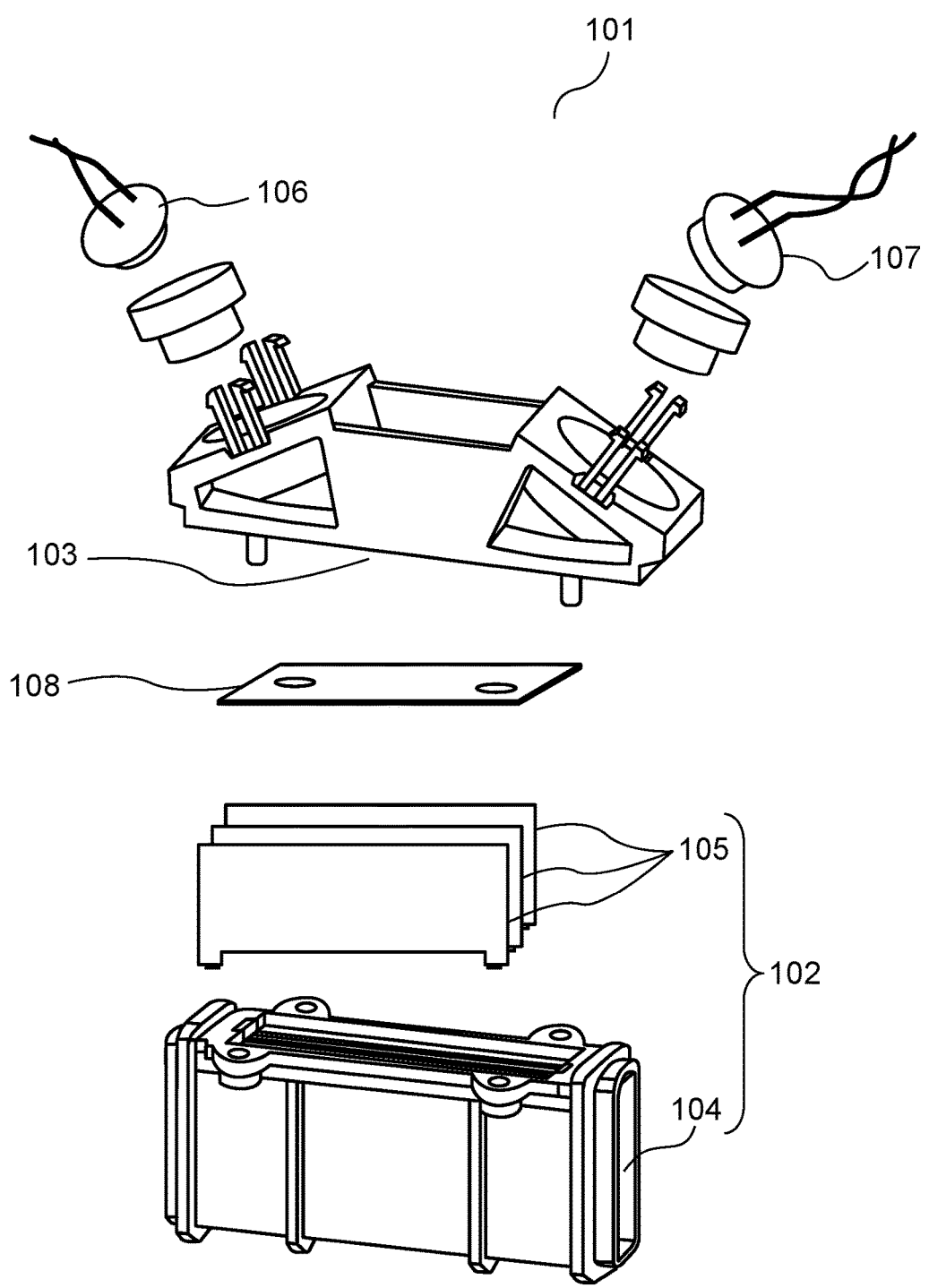
FIG. 6 is an exploded perspective view of a conventional flow rate measurement device.
Figure 7:
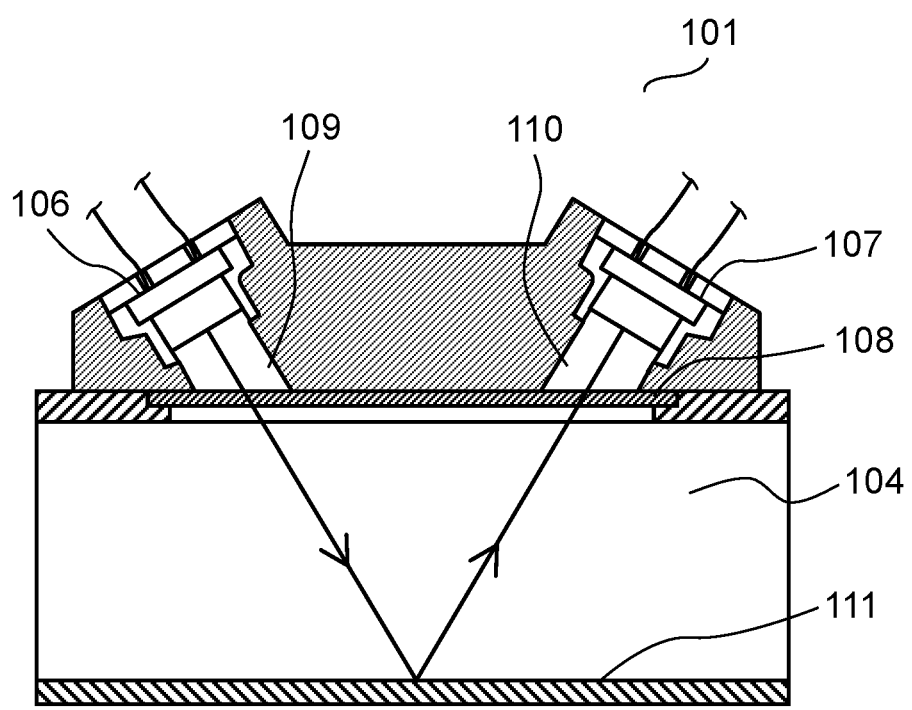
FIG. 7 is a vertical cross section of the flow rate measurement device illustrated in FIG. 6, taken along a plane along the flow direction.

FIG. 4 is a plan view of a turbulence reduction component according to Embodiment 1 of the present invention. FIG. 5 is a detailed plan view of the same turbulence reduction component.

In FIG. 4, first opening portion 9 and second opening portion 10 of turbulence reduction component 8 each have a rectangular shape. Length (length in the flow direction) L1 of first opening portion 9 and length L2 of second opening portion 10 are equal. Also, width (length in the direction orthogonal to the flow direction) W1 of first opening portion 9, width W2 of second opening portion 10, and channel width W of measurement channel 4 (see FIG. 1) are usually equal.

The dot-and-dash lines in FIG. 4 show the size, shape, and position of first hole portion 11 in relation to first opening portion 9 and the size, shape, and position of second hole portion 12 in relation to second opening portion 10. First opening portion 9 and second opening portion 10 each have a size set to limit first hole portion 11 and second hole portion 12, respectively.

FIG. 5 is a detailed plan view of the turbulence reduction component according to Embodiment 1 of the present invention.

In FIG. 5, a large number of openings 9a and 10a having regular hexagonal shapes and arranged in a staggered pattern are formed in opening portions 9 and 10 of turbulence reduction component 8. Making use of the fact that openings 9a and 10a have regular hexagonal shapes in identical size, frame pieces 15 and 16 are configured as follows: frame pieces 15 located between adjacent openings 9a are substantially identical to each other in width; frame pieces 16 located between adjacent openings 10a are substantially identical to each other in width; and frame pieces 15 and frame pieces 16 are substantially identical in width. That is to say, each of openings 9a and 10a is demarcated by six frame pieces 15 surrounding opening 9a and 10a, and each frame piece 15 is identical in width. For example, in the case of first opening portion 9, widths 9c, 9d, and 9e of frame pieces 15 are identical. With these, first opening portion 9 and second opening portion 10 are finely and uniformly divided along the flow direction.

In measurement channel 4, a plurality of partition plates 5b oriented in parallel to the flow direction are arranged side by side in a direction orthogonal to the flow direction. The plurality of partition plates 5b divide measurement channel 4 into a plurality of channel layers. The channel width of each of the channel layers (width in the direction orthogonal to the flow direction) is greater than the diameter (length D between opposite vertices) of circumcircles of openings 9a and 10a formed in opening portions 9 and 10 and having regular hexagonal shapes.

Specifically, the circumcircle of each of openings 9a and 10a has a diameter of from 0.3 mm to 0.5 mm approximately, frame pieces 15 have a width of 0.1 mm approximately, and the open area ratio of each opening 9a, 10a to opening portion 9, 10 is 50% to 80% approximately. Furthermore, measurement channel 4 has channel width W of 10 mm approximately. By providing about three to five partition plates 5b in measurement channel 4, the channel width of each channel layer is set to 1.5 mm to 2.0 mm approximately.

Hereinafter, the operation and advantageous effects of flow rate measurement device 1 having the above configuration will be described.

In FIG. 3, measured flow F of the fluid flowing through measurement channel 4 forms turbulence (vortices p and q, for example) in the vicinity of first opening portion 9 in first hole portion 11 and in the vicinity of second opening portion 10 in second hole portion 12, due to entrained flows attributable to the viscosity of the fluid.

The ultrasound emitted from first ultrasonic transceiver 6 passes through first opening portion 9 and second opening portion 10 in which no obstruction is present, and thus reaches second ultrasonic transceiver 7 without significant attenuation. However, since the ultrasound passes through first hole portion 11 and second hole portion 12, flow velocity V measured using the ultrasound includes a flow velocity component ($\Delta vp$ and $\Delta vq$) attributable to vortices p and q. Consequently, an error occurs in the flow rate measurement when the flow velocity component ($\Delta vp$ and $\Delta vq$) attributable to vortices p and q is significant as compared to flow velocity V of measurement channel 4, which is the primary target of the measurement.

As illustrated in FIG. 4, first opening portion 9 and second opening portion 10 of turbulence reduction component 8 each have a size set to limit first hole portion 11 and second hole portion 12, respectively. With this, vortices p and q are limited as compared to the case where turbulence reduction component 8 is absent.

A flow velocity error attributable to hole portions 11 and 12 is calculated by dividing the flow velocity component ($\Delta vp + \Delta vq$) attributable to vortices p and q by flow velocity V of the fluid flowing through measurement channel 4. Accordingly, by setting lengths L1 and L2 of opening portions 9 and 10 so that the flow velocity component ($\Delta vp + \Delta vq$) is adjusted to be less than or equal to a predetermined percentage of how velocity V, it is possible to reduce the flow velocity error attributable to hole portions 11 and 12 to less than predetermined accuracy (m) as shown in Expression (6) below.

$$(\Delta vp + \Delta vq)/V < m \quad \text{Expression (6)}$$

As described above, according to Embodiment 1, it is possible to reduce attenuation of ultrasound while ensuring necessary accuracy, by using turbulence reduction component 8 which transmits ultrasound and has opening portions 9 and 10 that reduce the occurrence of vortices p and q.

Next, as illustrated in FIG. 5, turbulence reduction component 8 has, at opening portions 9 and 10, a large number of openings 9a and 10a having regular hexagonal shapes. Since the widths of frame pieces 15 present between adjacent openings 9a and between adjacent openings 10a are substantially identical, the formation of vortices p and q at hole portions 11 and 12 is weakened or segmented. Furthermore, since openings 9a and 10a have regular hexagonal shapes, frame pieces 15 can be set substantially identical in width, and attenuation of ultrasound can be reduced to a minimum.

For example, when a comparison is made between circular openings arranged in a staggered pattern and regular hexagonal openings arranged in a staggered pattern given that both the circular openings and the regular hexagonal openings have the same open area ratio, the regular hexagonal openings arranged in a staggered pattern cause less attenuation of ultrasound. It is because the frame pieces of the circular openings arranged in a staggered pattern have nonuniform widths and are wide in some portion, and ultrasound is thus more easily blocked.

Furthermore, by arranging the regular hexagonal openings in a staggered pattern, variations in the area of overlap between partition plates 5b and frame pieces 15 of turbulence reduction component 8 become small even when the placement position of turbulence reduction component 8 and the arrangement of partition plates 5b are not uniform. This, as a result, makes it possible to narrow the distribution of the attenuation of ultrasound and reduce nonuniformity in magnitude of vortices p and q.

It should be noted that the shape of openings 9a and 10a does not necessarily have to be a regular hexagonal shape, and may be a polygonal shape other than a regular hexagonal shape, as long as all frame pieces 15 can be made substantially identical in width. For example, as means for making frame pieces 15 substantially identical in width, a hexagonal shape may be combined with a rectangular shape or a pentagonal shape.

In measurement channel 4, a plurality of partition plates 5b oriented in parallel to the flow direction are arranged side by side in a direction orthogonal to the flow direction. The plurality of partition plates 5b divide measurement channel 4 into a plurality of channel layers. The channel width of each of the channel layers is greater than the diameter of circumcircles of openings 9a and 10a formed in opening portions 9 and 10 and having regular hexagonal shapes, and thus a plurality of openings 9a and 10a are present in each of the channel layers. This, as a result, makes it possible to narrow the distribution of the attenuation of ultrasound and reduce nonuniformity in magnitude of vortices p and q.

As described above, the flow rate measurement device according to Embodiment 1 includes: measurement channel 4 having a rectangular cross section; and turbulence reduction component 8 disposed between measurement channel 4 and hole portions 11 and 12 and having opening portions 9 and 10. The flow rate measurement device further includes: a pair of ultrasonic transceivers 6 and 7 each connected to measurement channel 4 via turbulence reduction component 8 and one of hole portions 11 and 12; a propagation time measurer which measures a propagation time between the pair of ultrasonic transceivers; and a flow rate calculator which calculates flow rate Qt based on flow velocity V determined from the propagation time measured by the propagation time measurer. Opening portions 9 and 10 of turbulence reduction component 8 have frame pieces 15 which are substantially identical in width. This makes it possible to reduce, with small attenuation of ultrasound, the occurrence of a flow velocity error attributable to entrained flows in hole portions 11 and 12, thereby achieving accurate flow rate measurement.

Furthermore, according to Embodiment 1, since openings 9a and 10a each having a hexagonal shape are arranged in a staggered pattern in opening portions 9 and 10, frame pieces 15 can be set substantially identical in width, thereby further reducing the occurrence of turbulence attributable to entrained flows in hole portions 11 and 12. This makes the flow rate measurement more accurate.

Moreover, according to Embodiment 1, in measurement channel 4, a plurality of partition plates 5b oriented in parallel to the flow direction are arranged side by side in a direction orthogonal to the flow direction. The plurality of partition plates 5b divide measurement channel 4 into a plurality of channel layers. The channel width of each of the plurality of channel layers is greater than the diameter of circumcircles of openings 9a and 10a formed in opening portions 9 and 10 and each having a regular hexagonal shape. This makes it possible to reduce the occurrence of turbulence by finely and uniformly dividing the entrained flows in hole portions 11 and 12. As a result, the flow rate measurement becomes further accurate.

INDUSTRIAL APPLICABILITY

As described above, the flow rate measurement device according to the present invention can ensure measurement accuracy with small attenuation of ultrasound, and is thus widely applicable to gas meters and equipment that perform measurement with low power consumption.

What is claimed is:

1. A flow rate measurement device, comprising:
   a measurement channel;
   a pair of hole portions each being in communication with the measurement channel;
   a pair of ultrasonic transceivers disposed across the pair of hole portions from the measurement channel;
   a propagation time measurer which measures a propagation time between the pair of ultrasonic transceivers;
   a flow rate calculator which calculates a flow rate based on a flow velocity determined from the propagation time measured by the propagation time measurer; and
   a turbulence reduction component disposed between the pair of hole portions and the measurement channel and having a pair of opening portions at positions corresponding to the pair of hole portions, wherein
   the pair of opening portions of the turbulence reduction component each have frame pieces which are substantially identical in width.

2. The flow rate measurement device according to claim 1, wherein
   a plurality of openings demarcated by the frame pieces are formed in the pair of opening portions, the plurality of openings each having a hexagonal shape and being arranged in a staggered pattern.

3. The flow rate measurement device according to claim 2, wherein
   (i) in the measurement channel, a plurality of partition plates oriented in parallel to a flow direction are arranged side by side in a direction orthogonal to the flow direction,
   (ii) the plurality of partition plates divide the measurement channel into a plurality of channel layers, and
   (iii) a channel width of each of the plurality of channel layers is greater than a diameter of circumcircles of the plurality of openings formed in the pair of opening portions and each having the hexagonal shape.

* * * * *